United States Patent
Lucero et al.

(10) Patent No.: US 7,558,969 B1
(45) Date of Patent: Jul. 7, 2009

(54) ANTI-PIRATE CIRCUIT FOR PROTECTION AGAINST COMMERCIAL INTEGRATED CIRCUIT PIRATES

(75) Inventors: Elroy M. Lucero, San Jose, CA (US); Daniel J. Lucero, San Jose, CA (US); Hengyang (James) Lin, San Jose, CA (US); Andrew J. Franklin, San Jose, CA (US); Pavel Poplevine, Foster City, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 718 days.

(21) Appl. No.: 10/383,416

(22) Filed: Mar. 6, 2003

(51) Int. Cl.
 *G06F 11/07* (2006.01)
(52) U.S. Cl. .......................... 713/193; 713/194; 726/17; 726/21; 726/32; 726/33; 710/220; 710/240; 438/18; 716/1; 716/17
(58) Field of Classification Search ................... 726/26, 726/32, 33, 17, 21; 713/193, 194; 710/220, 710/240; 438/10, 11, 14, 17, 18; 716/1, 716/17
See application file for complete search history.

(56) References Cited

U.S. PATENT DOCUMENTS

| 5,034,980 | A | * | 7/1991 | Kubota | 713/189 |
| 5,208,447 | A | * | 5/1993 | Kruse | 235/380 |
| 5,467,396 | A | * | 11/1995 | Schossow et al. | 713/193 |
| 6,240,517 | B1 | * | 5/2001 | Nishioka | 726/20 |
| 2004/0170068 | A1 | * | 9/2004 | Williams | 365/200 |

\* cited by examiner

*Primary Examiner*—Kimyen Vu
*Assistant Examiner*—Edward Zee
(74) *Attorney, Agent, or Firm*—Dergosits & Noah LLP (57) ABSTRACT

Anti-pirate circuitry is provided for combating the theft of intellectual property contained with semiconductor integrated circuits. The anti-pirate circuit includes a unique number generator that provides a multi-bit die ID data string that is unique to the integrated circuit associated with the anti-pirate circuit. One time programmable (OTP) EPROM circuitry reads the die ID data string at wafer sort and writes the data content to nonvolatile memory. During a subsequent verification cycle, ID comparator circuitry compares the data string provided by the unique number generator to the stored contents of the nonvolatile memory. If the comparison results in a mismatch between more than a predefined number of bits, then the integrated circuit associated with the anti-pirate circuit is not enabled for operation.

20 Claims, 6 Drawing Sheets

Note: Coding can be modified as desired

ANTI-PIRATE CIRCUIT FOR PROTECTION AGAINST COMMERCIAL INTEGRATED CIRCUIT PIRATES

TECHNICAL FIELD OF THE INVENTION

The present invention relates to semiconductor integrated circuits and, in particular, to circuitry that combats the theft of intellectual property contained within integrated circuits.

BACKGROUND OF THE INVENTION

The anti-pirate circuitry disclosed herein is intended to combat the theft of intellectual property contained within integrated circuits (IC), such as patent protected circuits, copyrighted works, mask works and computer software.

Unfortunately, the theft of integrated circuit technology is not always prevented by the existence of legal barriers to its use. While a new circuit design may have significant commercial value, it may not be possible or practical to obtain or enforce patent rights in all countries of the world in which the circuit will be made, sold or used. While mask work and copyright protection may be available even if patent protection is not, the pirating and unauthorized copying of integrated circuit designs continues to cause serious economic harm to the original developers and owners of IC intellectual property.

It would, therefore, be highly desirable to have available a low cost, but effective technique for combating IC pirates.

SUMMARY OF THE INVENTION

An anti-pirate circuit in accordance with the present invention includes unique number generator circuitry, one time programmable (OTP) EPROM circuitry and ID comparator circuitry. The unique number generator circuitry provides a multi-bit die ID data string that is unique to the integrated circuit associated with the anti-pirate circuit. The OTP EPROM circuitry reads the die ID data string from the unique number generator at wafer sort and stores the die ID data string in a nonvolatile memory. During a subsequent verification cycle, the ID comparator circuitry compares the die ID data string provided by the unique number generator to the data content stored by the OTP EPROM. If the comparison results in a mismatch between more than a predefined number of bits, then the IC associated with the anti-pirate circuit is not enabled for operation.

The disclosed anti-pirate circuit does not make the pirating or copying of the IC mask set any more difficult. Rather, it forces the pirate to not only duplicate the IC mask set, but also duplicate a large portion of the product manufacturing flow, including hardware (fabrication and test equipment) and software (wafer sort test software). Although there is no perfect hardware/software anti-piracy circuit, the circuit of the present invention forces the pirate to invest so much time and money to "crack" the product that it renders the theft economically non-viable. The protection provided by this circuit is nearly absolute for most commercial IC pirates.

The features and advantages of the present invention will be more fully understood and appreciated upon consideration of the following detailed description and the accompanying drawings which set forth an illustrative embodiment in which the principles of the invention are utilized.

DETAILED DESCRIPTION OF THE INVENTION

An anti-pirate circuit in accordance with the present invention, when added to an integrated circuit chip, requires that the manufacturer add steps to the product development and test flow. These extra steps are not expensive to the manufacturer because the circuitry itself is small and, in most cases, the manufacturer must already test the chip before packaging (i.e., wafer sort tests).

As discussed in greater detail below, the anti-pirate circuit is interrogated at wafer sort to determine the chip's die ID and then the die ID is programmed into the anti-pirate circuit's nonvolatile memory. Not until this Read/Program cycle is completed, and a subsequent verification cycle is also successfully completed, is the chip's original operational circuitry allowed to function correctly. In other words, the anti-pirate circuit is a type of "chip enabler" that is activated at wafer sort.

These extra steps require the IC pirate to not only duplicate the IC mask set, but the pirate must also duplicate the wafer sort equipment and at least a portion of the wafer sort test program before the pirated mask set can be used to produce activated (working) chips.

An embodiment of an anti-pirate circuit in accordance with the present invention will now be described twice: first at the block level so that the concepts employed will be understood, and second, at the gate level.

Figure 1:
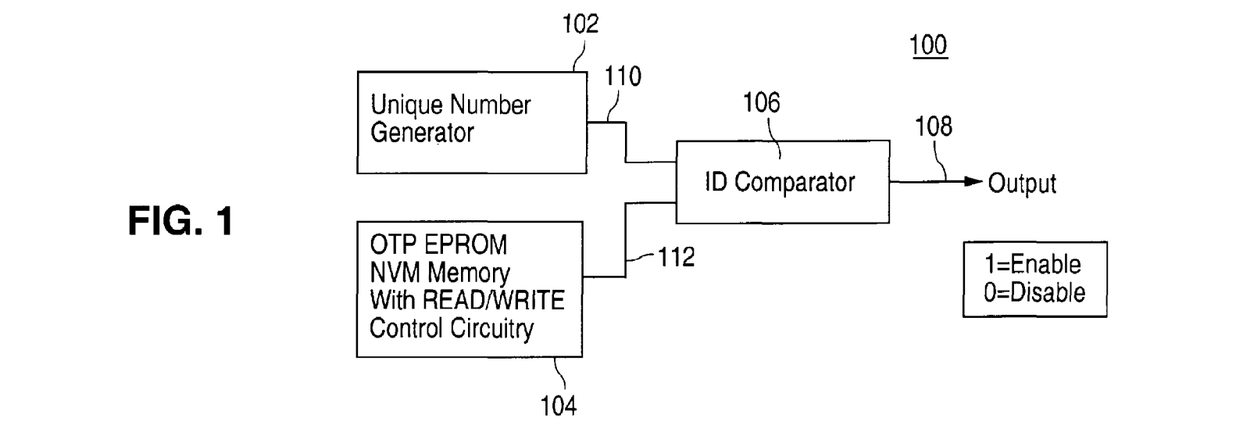
FIG. 1 is a block diagram illustrating an embodiment of an anti-pirate circuit in accordance with the present invention.

As shown in FIG. 1, an embodiment of an anti-pirate circuit 100 in accordance with the present invention includes three primary circuit blocks: a 256 bit unique number generator 102, a one time programmable (OTP) electrically programmable read only memory (EPROM) 104, and an ID comparator 106.

The unique number generator circuitry 102 provides a 256-bit data string referred to herein as the "die ID." The die ID is unique to each and every IC die, i.e., no two IC dice have the same die ID. Those skilled in the art will appreciate that the die ID data string is not required to be 256 bits, but may be longer or shorter depending upon the desired level of security.

The 256 bit OTP EPROM circuitry 104 is a non-volatile memory that is only programmable at wafer sort. The OTP EPROM 104 contains all the logic necessary to read the data contents, i.e., the die ID, provided by the unique number generator 102 and to transfer this data to the non-volatile memory (i.e., READ/WRITE logic.) If the general logic of the chip already includes a non-volatile memory, then the OTP EPROM 104 can be instantiated as a portion of that memory; as stated above, the OTP EPROM portion of the non-volatile memory is, preferably, only programmable at wafer sort. Note that "imbedding" the OTP EPROM 104 within the general logic of the chip serves to "hide" it's location and purpose, making it more difficult to reverse engineer and defeat.

During the verification cycle, described in greater detail below, the ID comparator 106 compares the die ID data string from the unique number generator 102 to the stored data contents of the OTP EPROM 104. Note that, in the disclosed embodiment of the invention, the stored data can vary by as much as 31 bits and still be considered a "match" with the die ID data string; if the stored data vary by more than 31 bits, then a "mismatch" is declared. As with the OTP EPROM 104, preferably, the ID comparator 106 is "imbedded" within the general logic of the chip, thereby "hiding" its location and purpose, making it more difficult to reverse engineer and defeat. Furthermore, for maximum protection, portions of the ID comparator 106 circuitry can be made to have a dual purpose (i.e., part of the anti-pirate circuit 100 and also a fundamental part of the general logic of the chip). If this is the case, then disabling the anti-pirate function of the ID comparator 106 also disables the general logic of the chip.

At wafer sort, the die ID data string is read from the unique number generator 102 and programmed into the OTP EPROM 104. Since the OTP EPROM 104 can only be programmed at wafer sort, this operation must be performed and verified before packaging of the IC chip. Before correct operation of the chip can begin, the ID comparator 106 must compare the die ID contents of the unique number generator 102 to the stored data content of the OTP EPROM 104. If the ID's are declared a "match", then the output 108 of the ID comparator 106 is driven "active", shown in FIG. 1 as "high", to enable correct operation/function of the IC on the chip. If the ID's are declared a "mismatch", then the output 108 is driven "inactive", shown as "low" in FIG. 1, to disable correct operation/function of the IC on the chip. Thus, a successful "read-program-compare-match" operation "enables" the chip so that the remainder of the wafer sort tests can be completed normally. After assembly, only the "compare-match" portion of the sequence need be completed successfully in order to enable correct operation/function of the chip.

In the disclosed embodiment of the invention, the unique number generator 102 is a serial 256-bit read only memory. The data contents of the memory is unique to each and every die and is determined by the electrical "mismatch" of MOS transistors. As stated above, the 256-bit data string is referred to as the die ID. The die ID is very stable, but statistically as many 24 bits can change from one read cycle to another. In the disclosed embodiment of the invention, a die ID "match" is declared when the number of mismatched bits is less than 32.

Figure 2A:
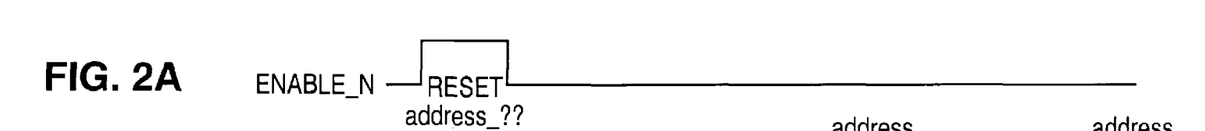
FIGS. 2A, 2B and 2C are a set of read waveforms illustrating a read operation for a unique number generator utilizable in accordance with the concepts of the present invention.
Figure 2B:
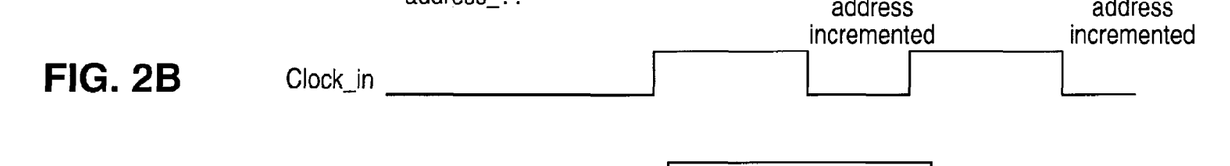
Figure 2C:
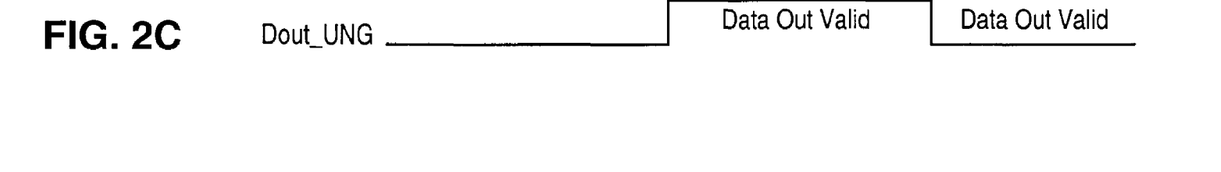
Figure 4:
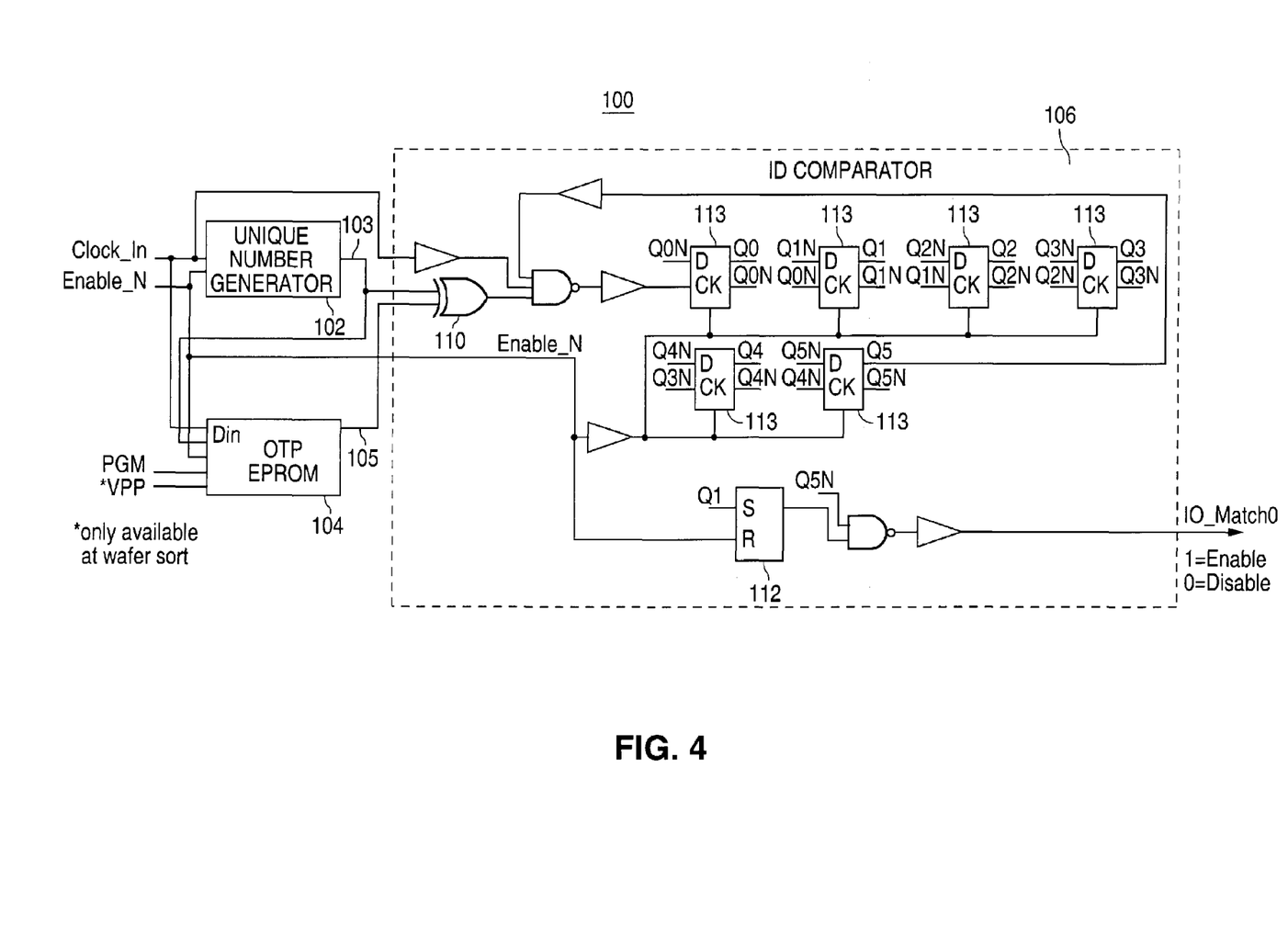
FIG. 4 is a gate level diagram illustrating an embodiment of an anti-pirate circuit in accordance with the present invention.

Referring to the FIG. 2 waveforms and to the FIG. 4 circuitry, the unique number generator 102 is read by taking the ENABLE_N signal "high" to reset the address counter in the ID comparator 106 to "address_0", then taken "Low" to enable the unique number generator 102 for a read operation. The Clock_In signal is clocked at 5 MHZ and data is presented at the output (Dout_UNG) 103 of the unique number generator 102 on every rising edge of the Clock_In signal. The internal address counter is incremented on every falling edge of the Clock_In signal line.

Figure 3A:
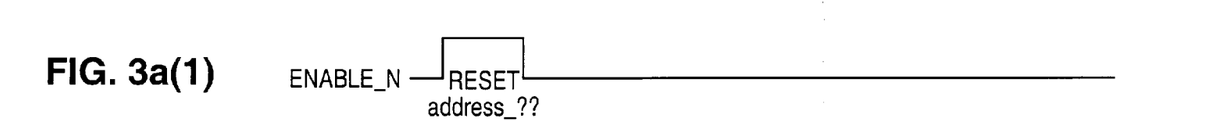
FIG. 3A is a set of programming waveforms illustrating a programming operation for a one time programmable (OTP) EPROM utilizable in accordance with the concepts of the present invention.

The OTP EPROM 104 is a 256-bit serial access non-volatile memory. In the well known manner, it contains all the circuitry required to write a data pattern into the memory and to read the pattern from the memory. Referring to the programming waveforms of FIG. 3a, the OTP EPROM 104 is reset/enabled by taking the ENABLE_N signal "high" to reset the address counter to "address_0", then taken "low" to enable the memory for a read or write cycle. For the write cycle, the VPP input to the OTP EPROM 104 is driven to the programming supply voltage level. Clock_In is driven "high" to enable the data input signal Din for programming into the memory. The PGM signal line is then driven "high" for the program pulse width time tPW. Clock_In is then driven "low" to increment the address counter. The sequence is repeated on the next rising edge of the clock until the entire memory is programmed.

Figure 3B:
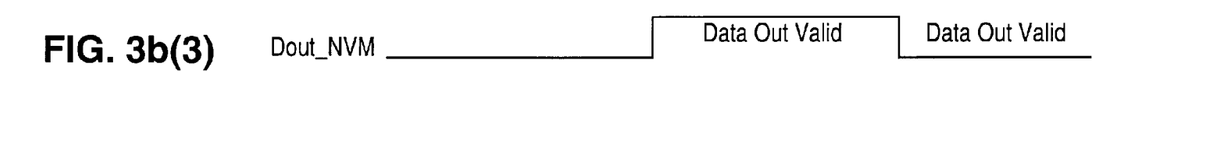
FIG. 3B is a set of read waveforms illustrating a read operation for a one time programmable (OTP) EPROM utilizable in accordance with the concepts of the present invention.

Referring to FIG. 3b, for the read cycle, VPP is held at the read supply voltage level and PGM is held "low." Similar to the unique number generator 102, the Clock_In signal is clocked at 5 MHZ and data is presented at the output (Dout_NVM) 105 of the OTP EPROM 104 on every rising edge of the Clock_In signal. The internal address counter is incremented on every falling edge of the Clock_In signal.

As stated above, the ID comparator 106 compares and counts the number of mismatched bits presented by the unique number generator 102 and the OTP EPROM 104. As shown in FIG. 4, the two data streams, Dout_UNG 103 and Dout_NVM 105, are compared using a two input XOR gate 110 during the low phase of the clock. Data is presented to the ID comparator 106 during the high phase of the clock, but the compare operation is done during the low phase of the clock to ensure that differences between read access timing of the unique number generator 102 and the OTP EPROM 104 do not generate false mismatches. As further shown in FIG. 4, in the disclosed embodiment of the invention, the number of bit mismatches are counted by a simple six stage ripple counter 113. The counter is reset to '000000' when ENABLE_N is "high" and is released to count when ENABLE_N is "low". The counter is triggered by the rising edge of the first CK input stage. Every time a bit mismatch occurs, a 0→1 transition is generated and counted by the counter. When 32 bit mismatches have been counted, counter output Q5 is fed back to the comparator to disable counting and forces the ID Comparator Output, ID_Match, to a "0". This logic state is used by the general logic of the chip to disable correct operation of the chip. If less than 32 bit mismatches occur, counter output Q5 will remain low and the ID Comparator Output, ID_Match, is driven to a "1". This logic state is used by the general logic of the chip to enable correct operation of the chip.

Another feature of the ID comparator 106 is the requirement that the ID comparator circuit 106 count a minimum of two mismatched bits. This is achieved by using an RS Latch 112, which is reset when ENABLE_N is "high" and set when Counter Output Q1, is toggled "high". Therefore, counter output Q1 must toggle to a "1" in order for the ID_Match output to go "high". This feature is added to the logic of the ID comparator 106 in order to make defeating the circuit more difficult. The pirate cannot simply defeat the circuit by forcing both data streams to all "0" or all "1", nor can the pirate force the comparator output "low", nor can the pirate disable the clock. The manufacturer will choose the last nibble of data (ID bits 251-255) to purposely invert before copying into the OTP EPROM 104.

Figure 5:
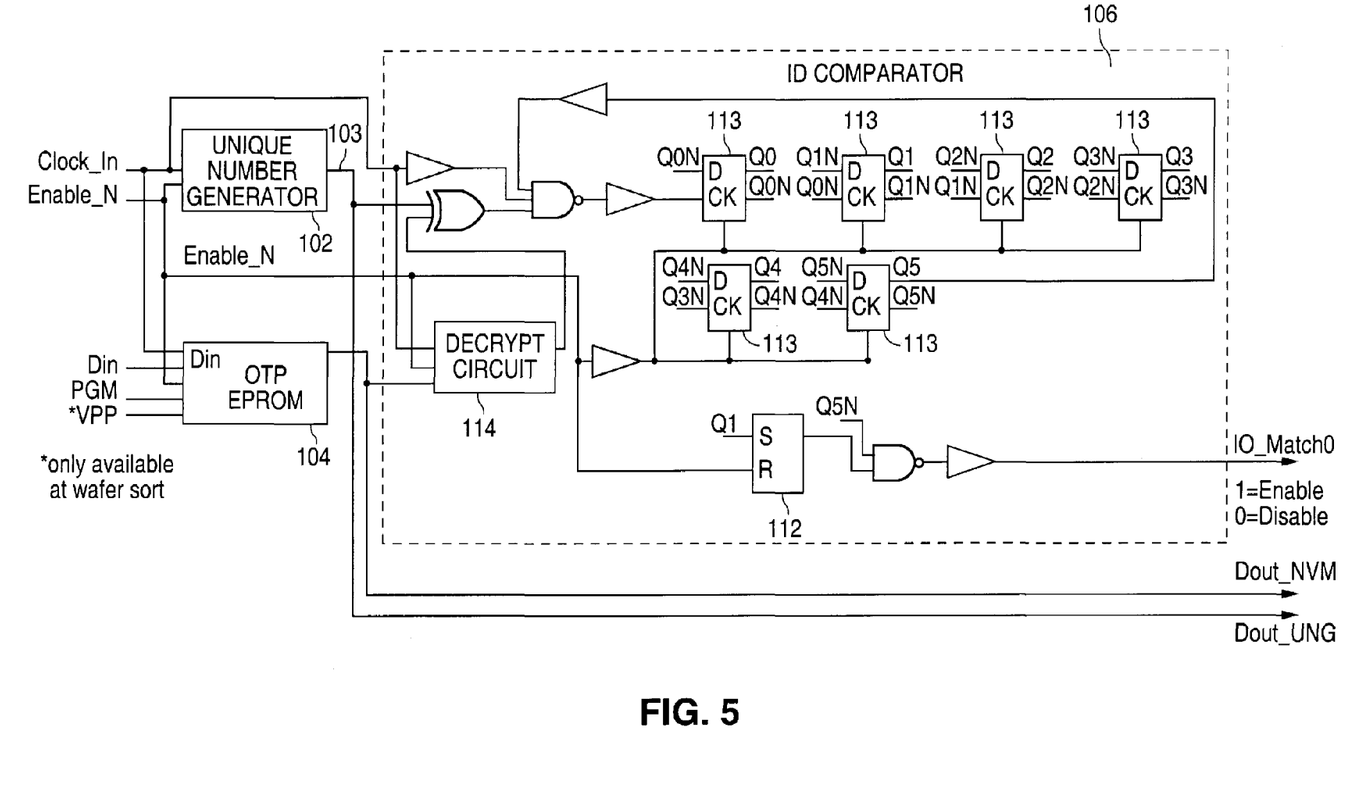
FIG. 5 is a gate level diagram illustrating an embodiment of an anti-pirate circuit in accordance with the present invention with die ID encryption.

The level of security can be increased by utilizing conventional encryption circuitry to encrypt the die ID pattern generated by the unique number generator 102 before programming it into the OTP-EPROM 104. This action will force the IC pirate to decipher the encoding algorithm before the pirate can properly program the OTP EPROM 104 at wafer sort. The downside is that the manufacturer must also include the decryption hardware/software "on chip" to decipher the data pattern produced by the OTP EPROM 104 and reconstruct the original die ID pattern 102 before presenting it to the ID comparator 106. As shown in FIG. 5, the decryption circuit 114 is added to the ID comparator 106 and is again "imbedded" within the general logic of the chip in order to make reverse engineering of the encryption algorithm more difficult.

Figure 6:
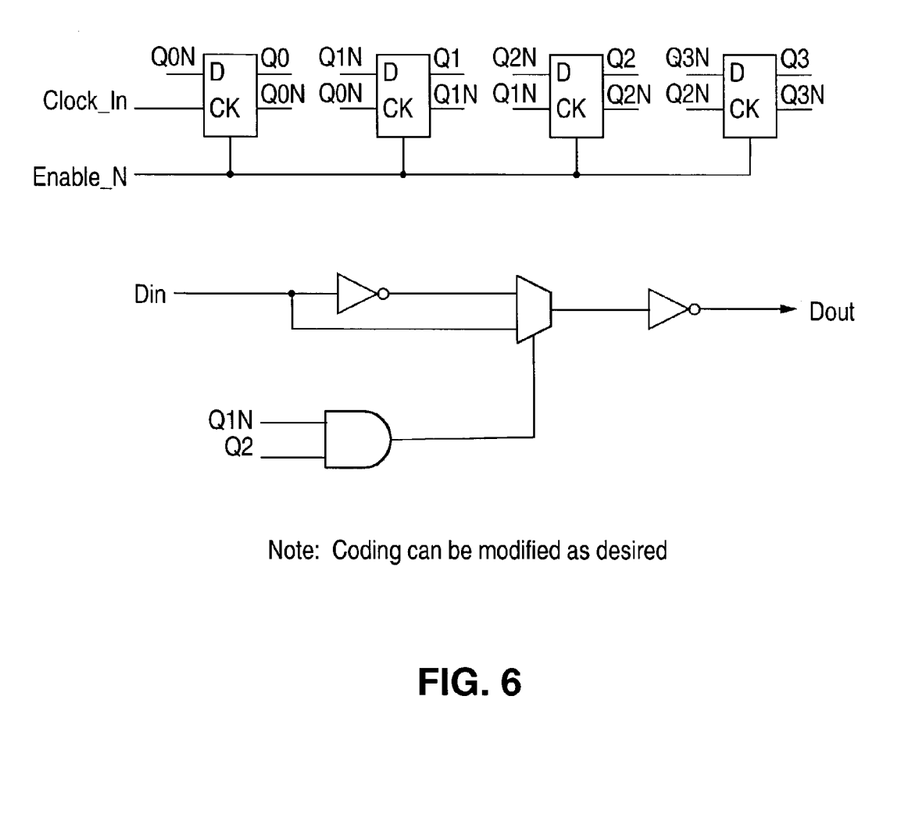
FIG. 6 is a gate level diagram illustrating a decryption circuit utilizable in accordance with the concepts of the present invention.

FIG. 6 shows a simple decryption circuit 114 utilizable in accordance with this aspect of the present invention. The decryption circuit 114 inverts Din every $4^{th}$, $5^{th}$, $12^{th}$ and $13^{th}$ clock cycle (64 bits). Dout is stable during the low phase of Clock_In.

Figure 7:
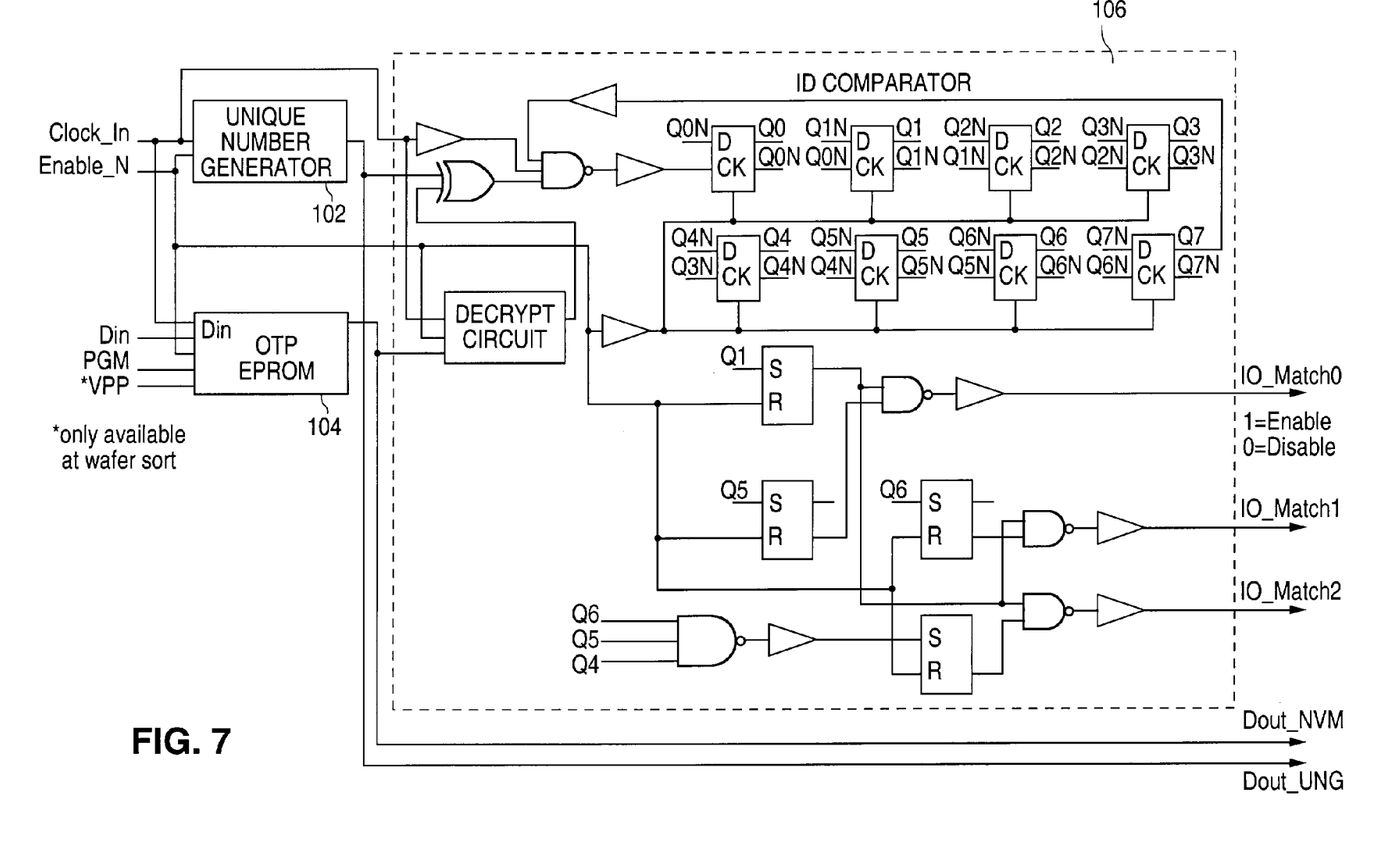
FIG. 7 is a gate level diagram illustrating an embodiment of an anti-pirate circuit in accordance with the present invention with die ID encryption and multiple levels of security/access.

As shown in FIG. 7, the anti-pirate circuit can easily be modified to provide multiple levels of security or multiple levels of access to chip features. This is accomplished by allowing an ID_Match to occur with more (or less) errors during the die ID verification cycle. By adding two more stages to the error counter, two more levels of "ID_Match" can be generated: ID_Match_0, ID_March_1, and ID_Match_2. As previously described, ID_Match_0 will toggle "high" when the number of mismatched bits is less than 32 (highest level of security/access), ID_Match_1 will toggle "high" when less than 64 bit mismatches have occurred, and ID_Match_2 will toggle "High" when less than 128 bit mismatches have occurred (lowest level of security/access). The manufacturer will program the OTP EPROM 104 with the pattern necessary to produce the correct number of matched and mismatched bits in the die ID field. The encryption scheme is unchanged.

TABLE 1

| Multiple levels of Security/Access | | | | |
|---|---|---|---|---|
| ID_Match Bits | | | Number of | Level of |
| Match_0 | March_1 | Match_2 | "Error" bits | Security/Access |
| 0 | 0 | 0 | >127 | No Access Allowed, chip NOT functional |
| 0 | 0 | 1 | <128 | Lowest level of security/access |
| 0 | 1 | 1 | <64 | Medium Level of security/access |
| 1 | 1 | 1 | <32 | Highest Level of security/access |

It should be understood that various alternatives to the embodiments of the invention described herein may be employed in practicing the invention. It is intended that the following claims define the scope of the invention and that circuits and methods within the scope of these claims and their equivalents be covered thereby.

What is claimed is:

1. A method of enabling initial operation of an integrated circuit structure that is formed on an integrated circuit die, the integrated circuit die having an on-chip unique number generator formed thereon, the method comprising:

prior to the initial operation of the integrated circuit structure, causing the on-chip unique number generator to generate a multi-bit die ID that is unique to the integrated circuit die;

storing the unique multi-bit die ID on the integrated circuit die as a multi-bit data string;

subsequent to storing the multi-bit data string on the integrated circuit die, causing the on-chip unique number generator to regenerate the unique multi-bit die ID;

comparing the regenerated unique multi-bit die ID and the stored multi-bit data string utilizing comparison circuitry that is formed on the integrated circuit die; and generating an enable signal required for the initial operation of the integrated circuit structure only in the event that the comparison of the regenerated unique multi-bit die ID and the stored multi-bit data string results in match between at least a predefined number of the bits of the regenerated unique multi-bit die ID and the stored multi-bit data string, and wherein the comparing step is performed entirely on the integrated circuit die.

2. A method as in claim 1, and wherein the storing step comprises storing the multi-bit data string in a non-volatile memory (NVM) element formed on the integrated circuit die.

3. A method as in claim 2, and wherein the NVM element comprises a one-time programmable EPROM.

4. A method as in claim 1, ands wherein the storing step occurs at the wafer sort step in the manufacture of the integrated circuit die.

5. A method as in claim 1, and wherein the step of storing the unique multi-bit die ID as the multi-bit data string comprises:

encrypting the unique multi-bit die ID generated by the on-chip unique number generator to provide the multi-bit data string.

6. A method as in claim 5, and wherein the comparing step comprises:

decrypting the stored multi-bit data string for comparison with the regenerated unique multi-bit die ID.

7. A method as in claim 1, and wherein the predefined number of bits is two or greater.

8. A method as in claim 1, and wherein the predefined number of bits is greater than thirty-two.

9. A method of controlling initial operation of an integrated circuit that is formed on an integrated circuit die, the integrated circuit die have an on-chip unique number generator formed thereon, the method comprising:

prior to the initial operation of the integrated circuit, causing the on-chip unique number generator to generate a multi-bit die ID that is unique to the integrated circuit die;

storing the unique multi-bit die ID on the integrated circuit die as a multi-bit data string;

subsequent to storing the multi-bit data string on the integrated circuit die, and prior to the initial operation of the integrated circuit, causing the on-chip unique number generator to regenerate the unique multi-bit die ID;

utilizing on-chip comparator circuitry formed on the integrated circuit die to compare the regenerated unique multi-bit die ID and the stored multi-bit data string; and in the event that the comparing step results in a match equal to or greater than a predefined number of bits of the regenerated unique multi-bit die ID and the stored multi-bit data string, providing an enable signal to the integrated circuit that is required for the initial operation of the integrated circuit; and in the event that the comparing step results in a match of less than the predefined number of bits of the regenerated unique multi-bit die ID and the stored multi-bit data string, providing a disable signal to the integrated circuit to disable the initial operation of the integrated circuit, and wherein the comparing step is performed entirely on the integrated circuit die.

10. A method as in claim 9, and wherein the disable signal permanently disables the initial operation of the integrated circuit.

11. A method as in claim 9, and wherein the stored multi-bit data string is stored in a non-volatile memory (NVM) storage structure that is formed on the integrated circuit die.

12. A method as in claim 11, and wherein the NVM storage structure comprises a one-time programmable EPROM.

13. A method as in claim 9, and wherein at least a portion of the on-chip comparator circuit is embedded in the integrated circuit.

14. A method as in claim 9, and wherein the storing step occurs at the wafer sort step on the manufacture of the integrated circuit structure.

15. An on-chip system for enabling the initial operation of an integrated circuit that is formed as part of an integrated circuit die, the system comprising:

an on-chip unique number generator that is formed on the integrated circuit die and that generates a multi-bit die ID that is unique to the integrated circuit die;

a non-volatile memory (NVM) storage element that is formed on the integrated circuit die and that, prior to the initial operation of the integrated circuit structure, stores the unique multi-bit die ID as a stored multi-bit data string; and an on-chip comparator that is formed on the integrated circuit die and that, prior to the initial operation of the integrated circuit structure, compares the unique multi-bit die ID that has been regenerated by the on-chip unique number generator and the stored multi-bit data string and that generates an enable signal required for the initial operation of the integrated circuit only in the event that the comparison results in a match of at least a predefined number of the bits of the regenerated unique multi-bit die ID and the stored multi-bit data string, the entire comparison being performed on the integrated circuit die.

16. A system as in claim 15, and wherein the NVM storage element is formed as a part of the integrated circuit.

17. A system as in claim 16, and wherein the NVM storage element comprises a one-time programmable EPROM embedded in the integrated circuit.

18. A system as in claim 15, and wherein at least a part of the on-chip comparator is embedded in the integrated circuit.

19. A system as in claim 15, and wherein, in the event that the comparison results in a match of less than the predefined number of bits, the comparator generates a disable signal that disables the initial operation of the integrated circuit.

20. A system as in claim 19, and wherein the disable signal permanently disables the initial operation of the integrated circuit.

* * * * *